United States Patent [19]

Hipp et al.

[11] 4,373,847
[45] Feb. 15, 1983

[54] RELEASABLE LOCKING DEVICE

[75] Inventors: Steven J. Hipp, Milwaukee; Norbert Hahn, Cudahy, both of Wis.

[73] Assignee: Rite-Hite Corporation, Cudahy, Wis.

[21] Appl. No.: 260,340

[22] Filed: May 4, 1981

[51] Int. Cl.³ .......................... B60R 9/06; B60D 1/00
[52] U.S. Cl. .................. 414/401; 280/490 R; 14/71.1
[58] Field of Search ................ 280/490 R, 504; 14/71.1, 71.5; 414/401, 396, 584

[56] References Cited

U.S. PATENT DOCUMENTS

| | | | |
|---|---|---|---|
| 868,719 | 10/1907 | Stephens | 14/71 |
| 1,271,676 | 7/1918 | Denman | 280/33.44 |
| 1,883,493 | 10/1932 | Berg | 280/33.44 |
| 2,050,518 | 8/1936 | Baumgardner | 280/33.44 |
| 2,064,615 | 12/1936 | Kuchar | 280/33.44 |
| 2,649,217 | 8/1953 | Mertes | 214/35 C |
| 2,945,396 | 7/1960 | Stultz, Jr. | 74/533 |
| 3,368,229 | 2/1968 | Pflager | 14/71 |
| 3,400,525 | 9/1968 | Snavely | 56/214 |
| 3,400,949 | 9/1968 | Kendall | 280/490 |
| 3,646,627 | 3/1972 | Potter | 14/71 |
| 3,692,330 | 9/1972 | Kendall | 280/402 |
| 3,699,601 | 10/1972 | Hecker, Jr. et al. | 14/71 |
| 3,708,183 | 1/1973 | Jones | 280/483 |
| 3,865,406 | 2/1975 | Dutton | 280/490 R |
| 3,922,006 | 11/1975 | Borges | 280/415 A |
| 3,961,714 | 6/1976 | Buehler | 214/41 R |
| 4,002,353 | 1/1977 | Sysya | 280/490 R |
| 4,076,273 | 2/1978 | Campion | 280/490 R |
| 4,127,856 | 11/1978 | Bickel | 280/508 |
| 4,137,587 | 2/1979 | Rosengren | 14/71.3 |
| 4,148,498 | 4/1979 | Taylor, Jr. | 280/490 R |
| 4,208,161 | 6/1980 | Hipp et al. | 414/401 |
| 4,261,682 | 4/1981 | Papps et al. | 414/528 |
| 4,264,259 | 4/1981 | Hipp | 414/401 |
| 4,267,748 | 5/1981 | Grunewald et al. | 74/529 |

*Primary Examiner*—Richard A. Bertsch
*Attorney, Agent, or Firm*—Neuman, Williams, Anderson & Olson

[57] ABSTRACT

A releasable locking device is provided for securing a parked vehicle to an adjacent upright structure. The device includes a first means mounted on the upright structure and a second means mounted on the first means for vertical movement relative thereto between operative and inoperative mode positions. When in an operative mode, the second means is in a raised position and interlockingly engages a portion of the parked vehicle. A third means is provided which releasably retains the second means in an operative mode and prevents accidental movement of the second means from an operative mode position to a lower inoperative mode position. The first means includes guides for restricting movement of the second means to a substantially vertical path.

13 Claims, 9 Drawing Figures

RELEASABLE LOCKING DEVICE

BACKGROUND OF THE INVENTION

In order to reduce the risk of serious bodily injury and product damage and loss during loading and unloading of a parked vehicle, it is important that the vehicle be securely held in place against the loading dock. Heretofore securement of such parked vehicle has commonly been by way of blocks which are wedged against the front of the rear wheels. In other instances cables and hooks or chains have been employed which engage a portion of the rear of the vehicle and a stanchion or cleat provided on or adjacent to the loading dock. Also, locking devices have been utilized which require a source of electrical and/or hydraulic power to effect operation of the device.

With regard to the use of blocks, they are ineffective where the roadway adjacent the loading dock is slippery because of rain, snow or ice. Furthermore, they frequently become lost or stolen and can accidently be moved out of a wedged position.

Where cables and chains are employed, it requires careful manual manipulation when attaching to or detaching from the vehicle and loading dock and as a result in many instances such cables and chains are ignored completely.

In devices requiring electro-hydraulic power sources, such devices are oftentimes expensive to install requiring substantial structural modifications to the dock. Furthermore, such devices are costly to manufacture and frequently are susceptible to malfunction.

SUMMARY OF THE INVENTION

Thus, it is an object of the invention to provide a device of the type described which is of simple, inexpensive construction and yet, is effective in securing a parked vehicle to an adjacent structure, such as a loading dock or the like.

It is a further object to provide a device of the type described which doesn't require an electrical and/or hydraulic power source in order to operate.

It is a still further object to provide a device of the type described which may be readily installed on an existing or new loading dock or the like and, if desired, may be utilized in combination with dock leveling equipment.

It is a still further object to provide a device of the type described which is simple to operate and requires the expenditure of only a small amount of manual effort to manipulate same.

It is a still further object to provide a vehicle locking device which is located so as not to interfere with the loading and unloading operation.

It is a still further object to provide a locking device which is capable of being used with vehicles which vary in size and shape over a wide range.

Further and additional objects will appear from the description, accompanying drawings and appended claims.

In accordance with one embodiment of the invention, a releasable locking device is provided for securing a parked vehicle to an adjacent structure such as a loading dock or the like. In accordance with governmental safety regulations, most trucks are required to have mounted adjacent the rear end thereof a depending safety bar, commonly referred to as an "ICC bar". The purpose of the safety bar is to prevent a low profile vehicle from passing under the truck bed, when involved in a rear end collision. In the improved device, a first means is provided which is mounted on an upright surface of the loading dock adjacent the parked vehicle. Mounted on the first means is a second means which is relatively movable in a substantially vertical path between operative and inoperative mode positions. When the second means is raised to its operative mode position, it interlockingly engages the ICC bar of the parked vehicle and retains the latter in its parked location relative to the loading dock. The device is also provided with a third means which coacts with the first and second means and prevents accidental movement of the second means from the operative mode position to the inoperative mode position.

DESCRIPTION

For a more complete understanding of the invention reference should be made to the drawings wherein.

Figure 1:
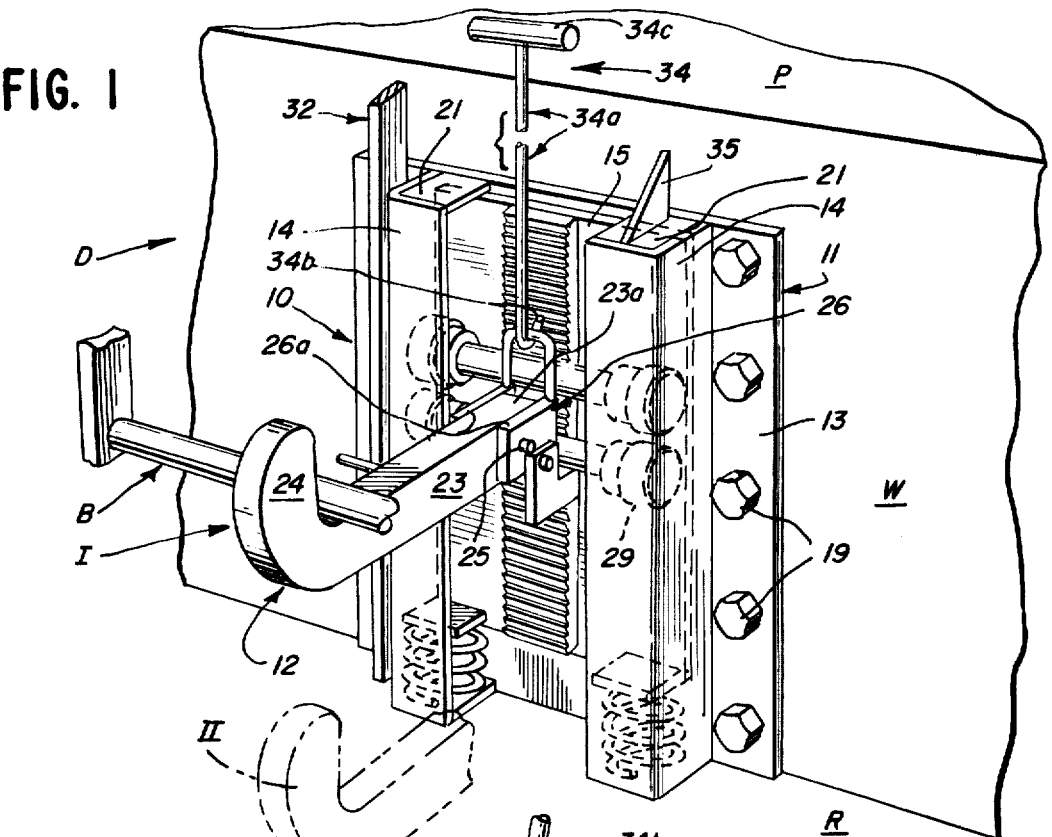
FIG. 1 is a fragmentary perspective view of one form of the improved locking device shown mounted on a wall of a loading dock and with the second means in an operative mode position and interlockingly engaging an ICC bar of a parked vehicle.

Referring now to the drawings and more particularly to FIG. 1, one form of the improved locking device 10 is shown mounted on the front vertical wall W of a conventional loading dock D. The wall W normally extends from an elevated horizontal platform surface P down to a roadway R on which a vehicle (e.g., a truck) is parked.

Device 10 in the illustrated embodiment includes a first means such as a composite frame assembly 11 on which a second means such as a hook-like member 12 is mounted for vertical movement between an operative mode position I and an inoperative mode position II, shown in phantom lines in FIG. 1. When member 12 is in position I, it is elevated relative to the roadway R and interlockingly engages the ICC bar B of the parked vehicle, not shown, in a manner to be described more fully hereinafter. Frame assembly 11 includes a first member such as a plate-like base member 13 which is anchored to the dock wall W by a plurality of bolts 19 or any other suitable means. Projecting outwardly from the exposed surface of member 13 is a pair of elongated, spaced, substantially parallel guides 14, which may have an L-shaped cross-sectional configuration. The guides coact with member 13 to form oppositely disposed vertical channels. The guides 14 are welded or otherwise affixed to base member 13.

Figure 2:
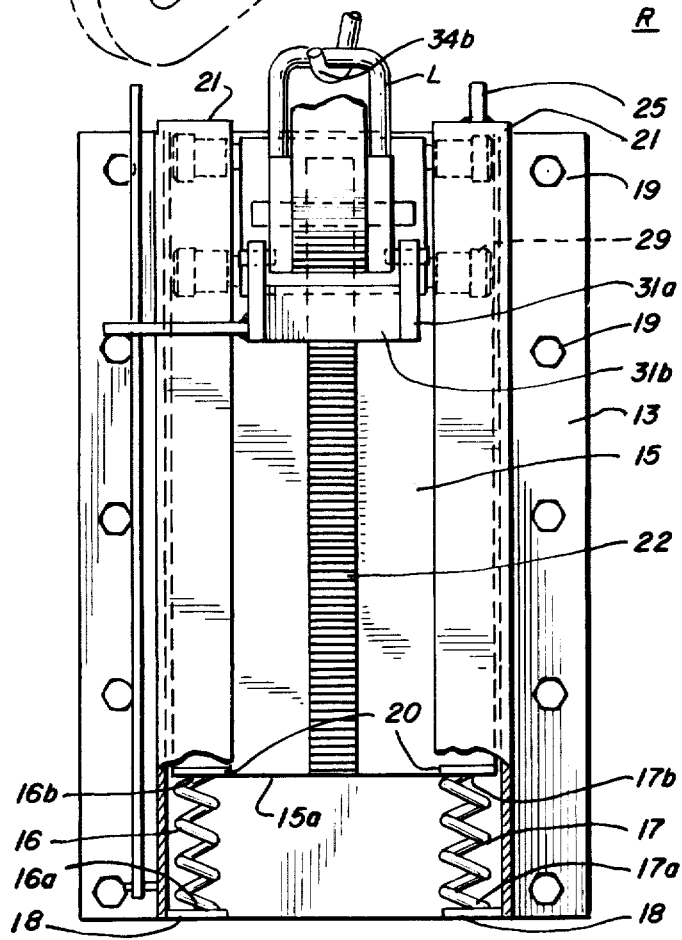
FIG. 2 is an enlarged fragmentary front elevational view of the device of FIG. 1 having portions removed so as to expose concealed components thereof.
Figure 3:
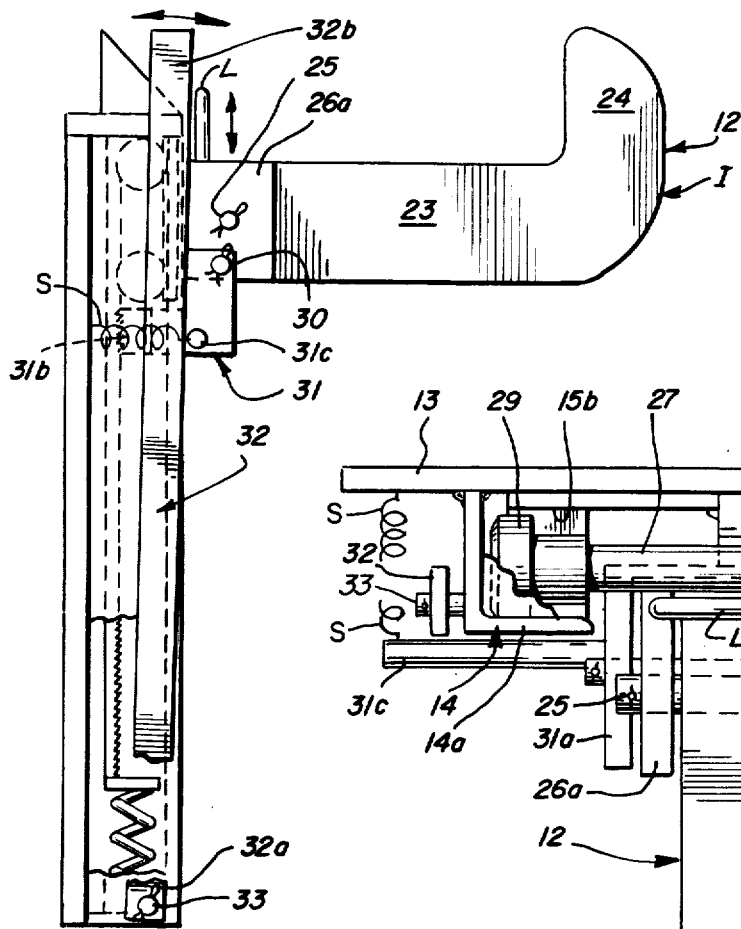
FIG. 3 is a left side elevational view of the device of FIG. 2 and having portions removed so as to expose a concealed component thereof.

Positioned between the guides 14 and in slidable face-to-face relation with respect to base member 13 is a second member such as an elongated plate-like element 15. As seen in FIGS. 2 and 3 the element 15 has a shorter vertical dimension than the guides 14 and the lower edge 15a thereof is engaged by a pair of matched heavy-duty biasing springs 16, 17. The lower end 16a, 17a of each spring is connected to a transverse bracket 18 which is secured to the bottom of each guide 14. The upper end 16b, 17b of each spring is connected to a second bracket 20 affixed to and projecting outwardly from the lower edge 15a of element 15. The springs 16, 17 are disposed within the guides and exert an upward biasing force on element 15 so that the latter normally assumes a rest position and engages a stop piece 21 secured to the upper end of each guide 14. The purpose of biasing element 15 to a raised rest position relative to base member 13 will become apparent from the discussion to follow.

Centrally disposed between the guides 14 and secured to element 15 is an elongated, substantially vertically disposed element such as ratchet 22. The ratchet and element 15 are slidable as a unit in a vertical plane relative to base member 13 when a depressing (downward) force, which exceeds the upward biasing force of springs 16, 17, is exerted on the ratchet 22 by the hook-like member 12. Such a depressing force occurs when the parked vehicle is being loaded and thus the springs absorb the load weight and prevent damage to the hook-like member 12 and/or frame assembly 11.

Figure 5:
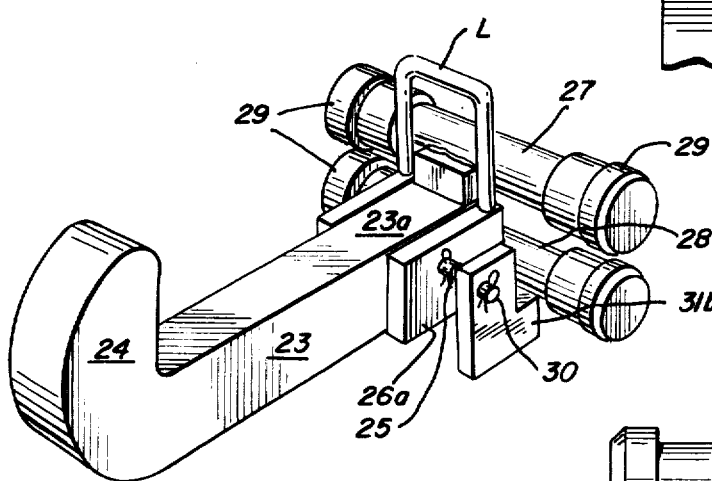
FIG. 5 is a perspective view per se of a component of the device of FIG. 1.
Figure 6:
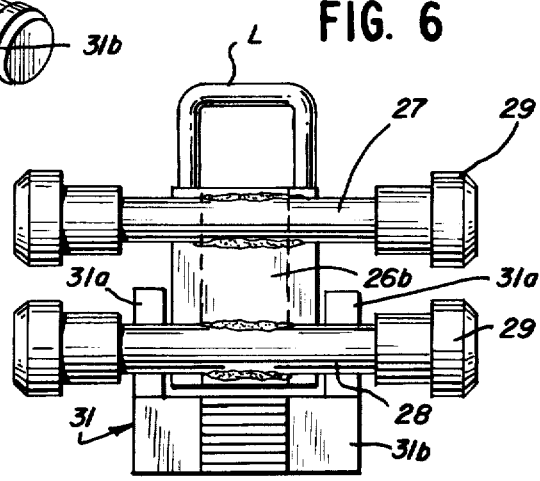
FIG. 6 is an enlarged rear elevational view of the component of FIG. 5.

The hook-like member 12, as seen more clearly in FIG. 5, includes an elongated first section 23 which projects outwardly from the frame assembly 11. Extending angularly upwardly from the outer distal end of section 23 is a second section 24. The two sections 23, 24 are preferably integral with one another. The inner end 23a of the first section is secured by a shear pin 25 to a follower unit 26. The shear pin 25 permits sections 23, 24 to pull away from unit 26, only if an excessive pulling force is exerted on section 24 by the vehicle when the latter is accidentally attempted to be driven away from the loading dock while member 12 is in its operative mode position. Thus, the shear pin will prevent serious damage being inflicted on the device and loading dock by reason of such an occurrence.

Unit 26 has a pair of spaced parallel lugs 26a which are disposed on opposite sides of the inner end 23a of the first section 23. The lugs are affixed to a cross piece 26b to which are secured a pair of laterally extending shafts 27, 28. The cross piece abuts the section end 23a. The shafts 27, 28 are in vertically spaced, parallel relation and the opposite ends of each shaft terminate within guides 14. Secured to the shaft ends are suitable rollers 29 which are sized so as to fit between the outer leg 14a of each guide 14 and the outer surface of the marginal portion 15b of the plate-like elements 15 which is opposite the guide leg 14a, see FIG. 4. Because of the relative size of the rollers 29, they coact with the adjacent guide legs 14a and the opposed marginal portions 15b of the locking element 15 and substantially retain the latter in sliding face-to-face relation with the base member 13. Because of the vertical spacing between shafts 27, 28, the hook-like member 12 is braced by the guides 14 so that the first section 23 will continuously remain in a substantial horizontal plane regardless of the relative position of the member 12 (i.e., in either the operative or inoperative position).

Secured to and projecting upwardly from the unit cross piece 26b is a loop L, the function of which will become apparent from the discussion hereinafter. The loop is positioned between the guide legs 14a, as seen more clearly in FIG. 4.

Pivotally connected at 30 to the lugs 26a of the follower unit 26 is a third means such as a pawl piece 31 which is adapted to coact with the serrations of ratchet 22 and prevent the hook-like member 12 from accidentally moving downwardly once the latter is disposed in a selected operative mode position, see FIG. 3. The pawl piece is preferably biased by a spring S so as to coact with the ratchet serrations. Pawl piece 31 in the illustration embodiment substantially subtends the follower unit 26 and has a pair of spaced, substantially parallel, upwardly extending arms 31a which overlie exposed portions of the lugs 26a and are pivotally connected thereto. Spanning the distance between and connected to arms 31a and subtending unit 26 is a jaw section 31b which is adapted to interlockingly engage the ratchet 22.

Figure 4:
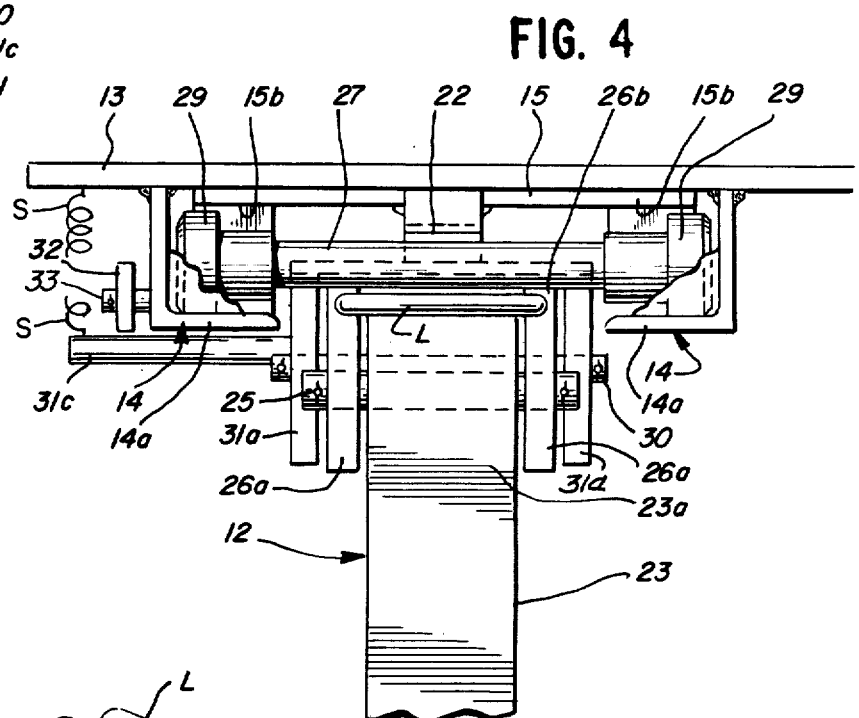
FIG. 4 is a fragmentary top plan view of the device of FIG. 2 and having portions removed to expose concealed components thereof.

Disposed in front of one guide 14 and extending laterally from one arm 31a of pawl piece 31 is a pintle 31c, see FIGS. 2-4. The pintle is spaced beneath the pivotal axis 30 of the pawl piece 31 and is adapted to be engaged by a manually actuated means such as release lever 32. The lever is disposed to the outside of one of the guides 14 and has the lower end 32a thereof pivotal about a pin 33 which projects laterally from the bottom portion of the adjacent guide 14. The upper end 32b of the release lever projects upwardly a substantial amount, but not above the plane of the dock platform, so as to facilitate manual manipulation of the lever, see FIG. 1. When the lever is manually pivoted in a clockwise direction, as viewed in FIG. 3, the lever will engage pintle 31c causing the pawl piece 31 to pivot in a counter-clockwise direction about pivot axis 30 thereby disengaging the jaw section 31b from the ratchet 22. Once the pawl piece is disengaged from the ratchet, the hook-like member 12 will fall by gravity to its inoperative mode position II, shown in phantom lines in FIG. 1. When member 12 is in the inoperative mode position, the upper end of the second section 24 thereof will be below the ICC bar B of the parked vehicle. Thus, it is important that member 12 be in its inoperative mode position when the vehicle is being maneuvered into or away from the parked position relative to the loading dock D.

Once the vehicle has assumed the proper parked position with respect to the loading dock—that is to say the vehicle rear end is adjacent the loading dock front wall and engages the bumpers, not shown, disposed on either side of the device 10 and mounted on the dock wall W—the hook-like member 12 is manually raised from its inoperative mode position II to the operative mode position I, see FIG. 1, wherein the member 12 interlockingly engages the ICC bar B. That is to say, the ICC bar B is trapped between member section 24 and the guides 14.

To facilitate the raising of member 12 to its operative mode position I, an implement 34 is provided which includes an elongated rod or shaft 34a having a first connecting means such as a hook 34b formed at its lower end and a cross handle 34c formed at its upper end. The rod 34a is of sufficient length so that a person standing on the dock platform P can conveniently manipulate the implement 34 to engage the hook 34b in a second connecting means such as a loop L provided on the follower unit 26, when the member 12 is in position II. Once the member 12 has reached its operative mode position I, the implement hook 34b is disengaged from loop L whereupon the member 12 will be retained in the desired operative mode position by the pawl piece jaw section 31b coacting with ratchet 22. While the lower end 34b of the implement 34 is shown as hook-shaped, it may be loop-shaped, whereupon a compatible hook would be substituted for the loop L on the follower unit 26.

If desired, a cam piece 35, see FIG. 1, may be affixed to and extend upwardly from one of the stop pieces 21 mounted on the upper end of a guide 14. The cam piece 35 may be utilized where the device is used in combination with dock leveling equipment, not shown, and prevents the depending lip of such equipment abutting and becoming jammed against the tops of the guides when the deck of the dock leveling equipment is lowered into a horizontal or downwardly inclined position. The operation of dock leveling equipment is well known in the art and forms no part of the instant invention. The cam piece is an optional accessory and may be eliminated if desired.

Figure 7:
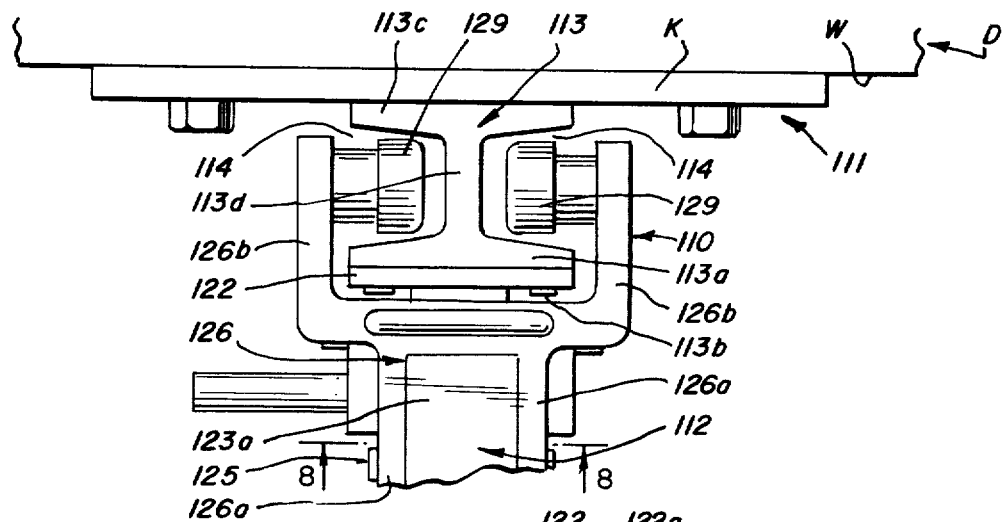
FIG. 7 is an enlarged fragmentary top plan view of a second form of the improved locking device.
Figure 8:
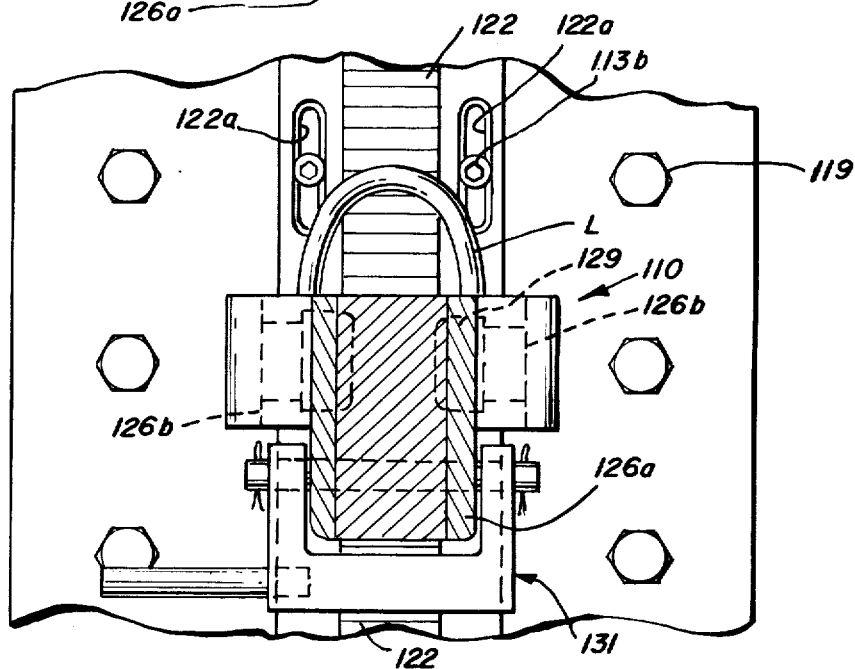
FIG. 8 is a fragmentary sectional view of the device taken along line 8—8 of FIG. 7.
Figure 9:
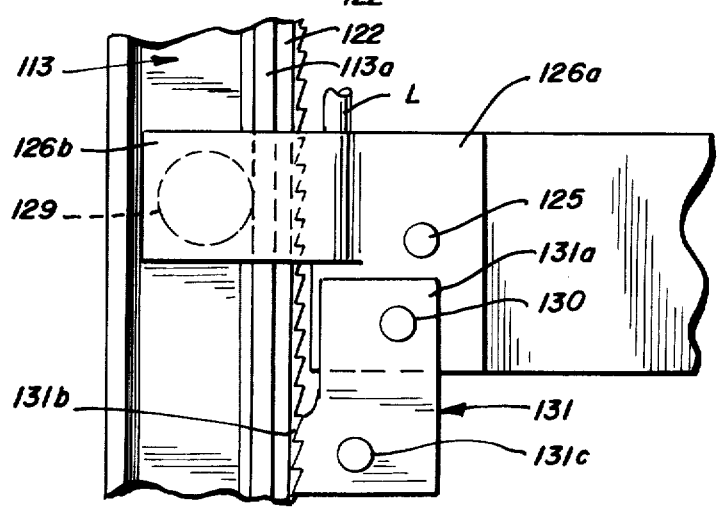
FIG. 9 is a left side elevational view of the device of FIG. 8.

FIGS. 7-9 disclose a modified form 110 of the improved device and components thereof corresponding to similar components of device 10 are given like identifying numbers, but in a one hundred series.

The frame assembly 111 in device 110 includes a base member 113 which has an H-beam configuration. The member 113 is fixedly secured in a vertical position by any suitable means (e.g., mounting plate K) on the exposed front wall W of a loading dock D or the like. Slidably mounted on the outer leg 113a of the member 113 is an elongated ratchet 122. The ratchet is mounted on the leg 113a by a plurality of guide bolts 113b which project from the leg 113a through longitudinally spaced, elongated slots 122a formed along the vertical side portions of the ratchet. The ratchet 122 is biased upwardly by a suitable heavy-duty spring, not shown, which engages the bottom edge of the ratchet in a manner similar to that previously described with respect to springs 16, 17.

The outer leg 113a of base member 113 is in spaced, substantially parallel relation with an inner leg 113c and is connected thereto by a transversely extending web 113d. The web 113d and outer leg 113a coact to form a pair of guides 114 which are adapted to accommodate the rollers 129 attached to the inner end of the hook-like member 112. As noted in FIG. 7, the inner end 123a of a section of member 112 is connected by a shear pin 125 to a first pair of outwardly extending arms 126a formed on a follower unit 126. The unit is also provided with a second pair of spaced, substantially parallel rearwardly extending arms 126b which are disposed on opposite sides of member 113. To each arm 126b is connected a roller 129.

Disposed in front of ratchet 122 and pivotally connected to unit arms 126a is a pawl piece 131. The configuration and location of the pawl piece 131 may be like that of pawl piece 31 previously described. Disengaging the pawl piece 131 from the ratchet 122 may be accomplished by a release lever, not shown, similar to that described with respect to device 10. Likewise an implement 34 may be utilized to manually lift the hook-like member 112 to an operative mode position. Other means, such as a permanently connected chain, cable, or the like may be utilized in place of the implement 34 in order to raise the hook-like member 12, 112 to its operative mode position. Furthermore, other means besides a release lever 32 may also be used to effect disengagement of the pawl piece 31, 131 from the ratchet 22, 122, when desired.

Thus, an improved releasable locking device has been described which is of simple, inexpensive, and durable construction; may be readily installed on an existing or new loading dock construction; may be readily and effectively utilized with vehicles having ICC bars which vary in size and shape over a wide range; is capable of operating properly under extreme climatic conditions; and will not interefere with the loading and unloading of the vehicle.

We claim:

1. A releasable locking device for securing a parked vehicle to an adjacent relatively stationary upright structure, said device comprising a first means mountable on an exposed surface of the structure, a second means mounted on said first means for substantially vertical movement relative thereto between operative and inoperative modes, the location of said second means when in an inoperative mode being a predetermined distance beneath the location of said second means when in an operative mode and in a non-contacting relation with the vehicle, and third means for releasably retaining said second means in an operative mode; said second means including a first section projecting outwardly a predetermined distance from said first means and the exposed surface of the structure, one end of said first section being mounted on said first means for selective independent movement relative thereto along a predetermined substantially vertical path, and a second section extending angularly upwardly from said first section and being spaced outwardly a substantially fixed distance from said first means and the exposed surface of the structure, said second means, when in an operative mode, being adapted to interlockingly engage a portion of the parked vehicle disposed intermediate the second section and said first means; said second means, when in an inoperative mode, being adapted to be in a lowered nonlocking relation with the parked vehicle.

2. The device of claim 1 wherein the first means includes a first member fixedly mountable on the structure exposed surface and a second member slidably mounted on said first member for limited independent substantially vertical relative movement, said second member being upwardly biased to assume a normal elevated rest position with respect to said first member, said second member and said second and third means being movable as a unit downwardly from said normal rest position only when a depressive external force exerted on said second means, while the latter is retained in an operative mode, exceeds the biasing force applied to said second member.

3. The device of claim 2 wherein the third means includes a first element carried by said second means and coacting with a complemental second element carried by the second member of said first means to prevent movement of said second means from an operative mode to an inoperative mode.

4. The device of claim 3 wherein the third means includes manually actuated means for releasing said first and second elements from a coactive relation.

5. The device of claim 3 wherein the complemental second element includes an elongated substantially vertically extending ratchet, and said first element includes a pawl.

6. The device of claim 5 wherein the pawl is biased to engage the ratchet and permits downward relative movement of said second means only when said pawl is released from the coactive relation with said ratchet.

7. The device of claim 5 wherein the pawl is pivotally mounted on the first section of said second means.

8. The device of claim 1 wherein the third means automatically retains the second means in an operative mode.

9. The device of claim 1 wherein the second means includes a secondary means for effecting manual pulling of said second means from an inoperative mode position to an operative mode position.

10. The device of claim 9 wherein the secondary means includes a manually actuated elongated implement having an end thereof connected to an implement-accommodating portion carried on said second means.

11. The device of claim 10 wherein the elongated implement includes a rod having a handle at one end and the opposite end being provided with a first connecting means, and the implement-accommodating portion includes a projecting complemental second connecting means provided on the first section of said second means, said first and second connecting means coacting with one another wherein an upward pulling force exerted by said implement is transmitted to said second means.

12. The device of claim 1 wherein the first means includes elongated upright guide means, and the first section of the second means includes guide-engaging elements carried on the one end of said first section and continuously maintaining said first section in an outwardly projecting relation with respect to said first means.

13. A releasable locking device for securing a parked vehicle to an adjacent upright structure, said device comprising a first means having a first member fixedly mountable on the structure and a second member mounted on said first member for limited substantially vertical relative movement, said second member being upwardly biased to assume a normal rest position; second means mounted on said first means for substantially vertical movement relative thereto between operative and inoperative modes, the location of said second means when in an inoperative mode being a predetermined distance beneath the location of said second means when in an operative mode; and third means for releasably retaining said second means in an operative mode, said third means having a first element carried by the second member of said first means, and a complemental second element carried by said second means, said first and second elements coacting with one another to prevent movement of said second means from an operative mode to an inoperative mode; said second means including a first section projecting outwardly from said first means, one end of said first section being connected to said first means and being guided thereby for selective relative movement in a predetermined substantially vertical path, and a second section extending angularly upwardly from said first section and being spaced outwardly from said first means, said second means, when in an operative mode, being adapted to interlockingly engage a portion of the parked vehicle disposed intermediate the second section and said first means; said second means, when in an inoperative mode, being adapted to be in a nonlocking relation with the parked vehicle; the second member of said first means being movable downwardly from the normal rest position only when a depressive external force exerted on said second means, while the latter is retained in an operative mode, exceeds the biasing force applied to said second member.

* * * * *